United States Patent [19]

Yoneshima et al.

[11] Patent Number: 5,055,227

[45] Date of Patent: Oct. 8, 1991

[54] FLUORESCENT COMPOSITION FOR LOW VELOCITY ELECTRON BEAM EXCITATION

[75] Inventors: Kunihiko Yoneshima, Hiratsuka; Fumio Takahashi, Odawara, both of Japan

[73] Assignee: Kasei Optonix, Ltd., Tokyo, Japan

[21] Appl. No.: 523,560

[22] Filed: May 15, 1990

[30] Foreign Application Priority Data

May 16, 1989 [JP] Japan ................................. 1-122640

[51] Int. Cl.$^5$ .............................................. C09K 11/62
[52] U.S. Cl. ...................... 252/301.6 S; 252/301.4 R; 252/301.6 R
[58] Field of Search .................. 252/301.4 R, 301.4 S, 252/301.1 S, 301.6 R

[56] References Cited

U.S. PATENT DOCUMENTS 4,208,612 6/1980 Hase et al. ..................... 252/301.6 S Primary Examiner—Jack Cooper
Attorney, Agent, or Firm—Oblon, Spivak, McClelland, Maier & Neustadt

[57] ABSTRACT

A fluorescent composition for low velocity electron beam excitation, comprising a phosphor capable of emitting light under excitation by a high velocity electron beam and indium oxide ($In_2O_3$) mixed or mutually adhered to each other, wherein the half value width of the strongest diffraction line in the diffraction X-ray spectrum of the indium oxide ($In_2O_3$) is within a range of from 0.10° to 0.25°.

6 Claims, 1 Drawing Sheet

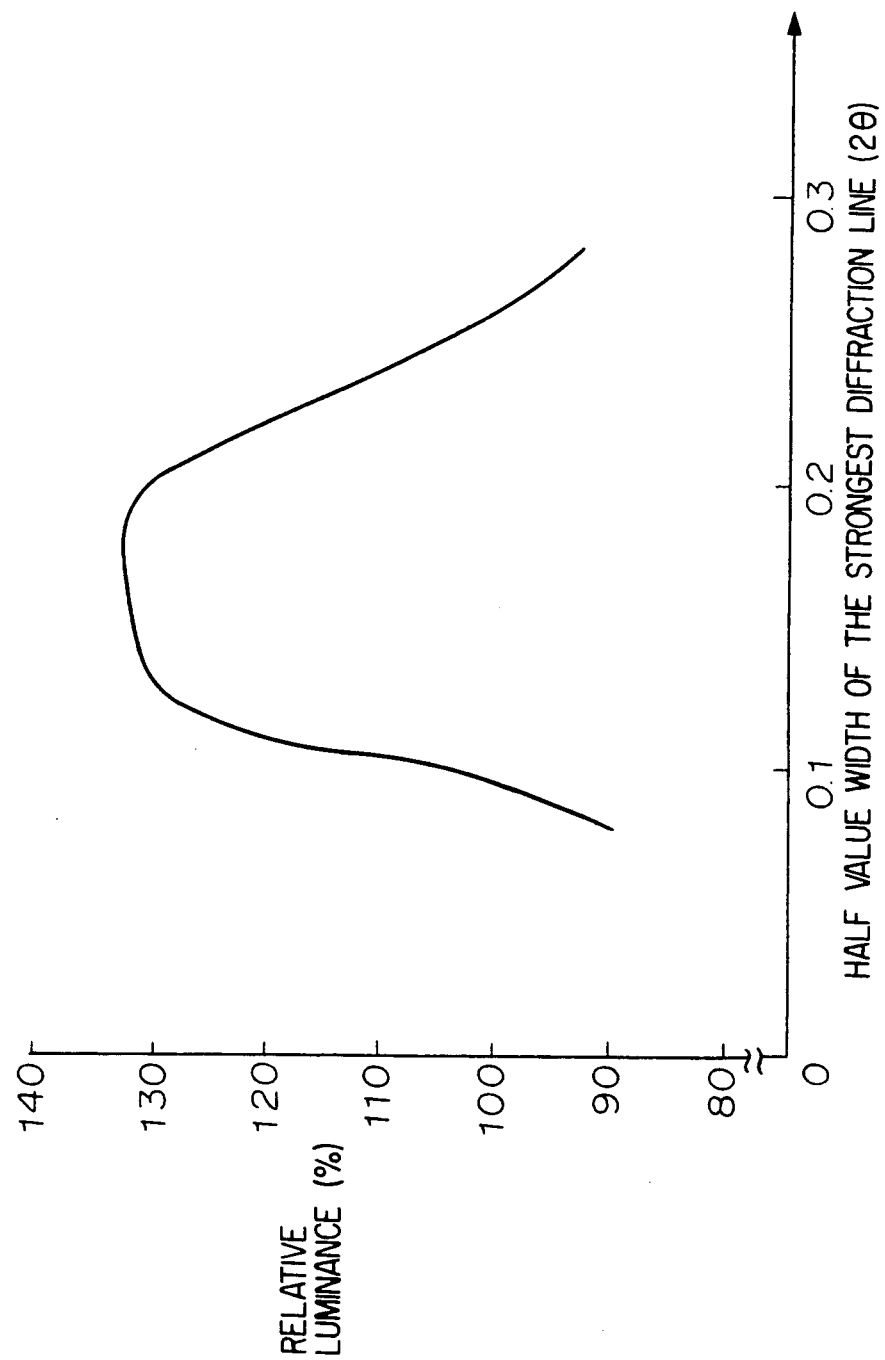

FLUORESCENT COMPOSITION FOR LOW VELOCITY ELECTRON BEAM EXCITATION

BACKGROUND OF THE INVENTION

1. Field of the Invention

The present invention relates to an improvement in a fluorescent composition for low velocity electron beam excitation, which exhibits emission of light of high luminance under excitation with a low velocity electron beam at an acceleration voltage of not higher than 1 kV, (hereinafter referred to simply as a "fluorescent composition").

2. Discussion of Background

Phosphors having high electrical resistance including a series of sulfide phosphors consisting essentially of a sulfide of the formula $(Zn_{1-x},Cd_x)S$, wherein x is a number satisfying a condition Of $0 \leq x \leq 1$, as the host material, which is activated by zinc (Zn), silver (Ag), gold (Au), copper (Cu), manganese (Mn) or the like and further coactivated by halogen, aluminum (Al), gallium (Ga), indium (In) or the like, as well as oxyacid phosphors such as cerium (Ce)-activated yttrium aluminate-gallate phosphor $\{Y_3(Al,Ga)_5O_{12}:Ce\}$ and europium (Eu)-activated barium.magnesium alminate phosphor $\{(Ba,Mg)0.6Al_2O_3:Eu\}$, and oxide phosphors such as europium (Eu)-activated yttrium oxide phosphor $(Y_2O_3:Eu)$, do not substantially emit light under excitation by a low velocity electron beam, although they emit light well under excitation by a high velocity electron beam at an acceleration voltage of higher than 1 kV. Fluorescent compositions obtained by mixing conductive materials such as indium oxide $(In_2O_3)$, zinc oxide (ZnO) and tin oxide $(SnO_2)$ with such phosphors having high electrical resistance, exhibit visible emissions of high luminance ranging from blue to red specific to the phosphors which are the main components of the fluorescent compositions, under excitation by a low electron beam at an acceleration voltage of not higher than 1 kV (Japanese Examined Patent Publications No. 33153/1984, No.33155/1984, No. 44035/1987 and No. 53554/1987). Therefore, such fluorescent compositions have recently found much use as the fluorescent screens for fluorescent display tubes capable of multi-color displaying in combination with ZnO:Zn which has been used since old as a phosphor showing greenish white emission, which are useful for automobiles (as displays for clocks, car audios, speed meters or tachometers), audio-visual appliances, video tape recorders (VTR), etc.

However, especially in the case of fluorescent display tubes for automobiles, there is a limitation in the acceleration voltage for the fluorescent display tubes in view of the power sources to be used, whereby according to the conventional technique, the luminance of the fluorescent display tubes is inadequate, particularly it lacks in the visibility under the external daylight, and this causes a problem from the viewpoint of the safe driving of the automobiles.

SUMMARY OF THE INVENTION

The present invention has been made in view of these circumstances, and aims at providing a fluorescent composition capable of emitting light with higher luminance when excited by a low velocity electron beam at an acceleration voltage of not higher than 1 kV. In order to attain the above object, the present inventors have conducted extensive researches on the relations between the types and physical properties of conductive materials, and the luminance of the fluorescent compositions thereby obtained, with respect to conductive materials constituting fluorescent compositions composed of mixtures comprising phosphors and conductive materials, which are presently used for fluorescent display tubes capable of multi-color displaying. As a result, they have discovered that the luminance of the fluorescent composition varies substantially depending upon the degree of crystallization of the conductive material used, and a fluorescent composition having a particularly high luminance can be obtained when indium oxide $(In_2O_3)$ having a certain specific degree of crystallization is used as the conductive material. Namely, there is an interrelation between the half value width ($2\theta$) of a diffraction line in the diffraction X-ray spectrum of a crystal (showing the relation between the intensity of the diffraction line and the double angle ($2\theta$) of the angle of diffraction ($\theta$) of the X-rays by the crystal when X-rays were irradiated to the crystal) and the degree of crystallization of the crystal, i.e. the narrower the half value width, the larger the degree of crystallization. Accordingly, with respect to various $In_2O_3$, diffraction X-ray spectra were measured, and the half value widths of the respective strongest diffraction lines (i.e. the diffraction lines at the index of plane [2,2,2] in the case of $In_2O_3$) were obtained. At the same time, the interrelation thereof with the respective fluorescent compositions using such $In_2O_3$ was investigated. As a result, it has been found that a fluorescent composition having a particularly high luminance can be obtained when $In_2O_3$ having a half value width ($2\theta$) of the strongest diffraction line within a range of from 0.10° to 0.25°, is employed, and the present invention has been accomplished on the basis of this discovery.

The present invention provides a fluorescent composition for low velocity electron beam excitation, comprising a phosphor capable of emitting light under excitation by a high velocity electron beam and indium oxide $(In_2O_3)$ mixed or mutually adhered to each other, wherein the half value width of the strongest diffraction line in the diffraction X-ray spectrum of the indium oxide $(In_2O_3)$ is within a range of from 0.10° to 0.25°.

BRIEF DESCRIPTION OF THE DRAWING

FIG. 1 is a graph showing the relation between the half value width ($2\theta$) of the strongest diffraction line in the diffraction X-ray spectrum of $In_2O_3$ as one of the constituting components of the fluorescent composition and the relative luminance of the fluorescent composition thereby obtained.

DETAILED DESCRIPTION OF THE PREFERRED EMBODIMENTS

Now, the process for producing the fluorescent composition of the present invention will be described in detail.

$In_2O_3$ to be used as one of the constituting components of the fluorescent composition of the present invention is selected among commercially available $In_2O_3$ reagents, $In_2O_3$ obtained by calcining an In salt such as $In(NO_3)_3$ and $InCl_3$, or $In_2O_3$ activated by a rare earth element such as Eu or Ce and a solid solution of $In_2O_3$ with $SnO_2$ (in this specification, these will be generally referred to as "$In_2O_3$") so that it is $In_2O_3$ wherein the half value width ($2\theta$) of the strongest diffraction line in the diffraction X-ray spectrum is within a range of from 0.10° to 0.25°. Particularly when $In_2O_3$ having the half value width within a range of from 0.13° to 0.20°, is used among them, it is possible to obtain a fluorescent composition having an especially high luminance. Further, it is possible to further improve the luminance of the resulting fluorescent composition by recalcining $In_2O_3$ to be used here, at a temperature of from 900° to 1,200° C. in air, in an oxygen gas atmosphere or in a neutral gas atmosphere such as argon gas or nitrogen gas while controlling the degree of crystallization so that the half value width of the strongest diffraction line in the diffraction X-ray spectrum will not be outside the range of from 0.10° to 0.25°.

There is no particular restriction as to the phosphor to be used as another constituting component of the fluorescent composition of the present invention. Any phosphor may be employed so long as it is capable of emitting light under excitation of a high velocity electron beam. However, from the viewpoint of the luminance under excitation by a low velocity electron beam, it is particularly preferred to employ among such phosphors, zinc-activated zinc oxide phosphors (ZnO:Zn) and sulfide phosphors having a sulfide host material of the formula $(Zn_{1-x},Cd_x)S$ such as ZnS:[Zn], ZnS:Ag,Cl, Zns:Ag,Cl,Li, ZnS:Ag,Al, ZnS:Mn,Cl, (Zn,Cd)S:Cu,Al, (Zn,Cd)S:Au,Al, (Zn,Cd)S:Au,Cu,Al, or CdS:Ag, activated by an activator such as zinc (Zn), silver (Ag), gold (Au), copper (Cu) or manganese (Mn) and further, if necessary, coactivated by a first coactivator such as aluminum (Al) or a halogen element (Cl, Br, I or F) and by a second coactivator such as an alkali metal element (Li, Na, K, Rb or Cs), gallium (Ga) or indium (In).

To produce the fluorescent composition of the present invention, prescribed proportions of the above $In_2O_3$ and the selected phosphor are adequately mixed by means of e.g. a mortar, a ball mill or a mixer mill, or by a method of e.g. sieving. Otherwise, the fluorescent composition of the present invention can be obtained by adhering the above $In_2O_3$ to the surface of particles of the above phosphor, by a conventional method such as a method using gelatin and gum arabic as adhesive (Japanese Examined Patent Publication No. 3677/1979), an electrostatic coating method (Japanese Examined Patent Publication No. 44275/1979) or a method using an organic binder such as ethylene cellulose or nitro cellulose (Japanese Examined Patent Publication No. 33266/1987). Here, the mixing weight ratio of $In_2O_3$ to the phosphor is substantially the same as in the case of the conventional fluorescent composition comprising a phosphor with a high resistance and a conductive material. From the viewpoint of the luminance of the resulting fluorescent composition, in the case where $In_2O_3$ and the phosphor are simply mixed, it is preferred to adjust the weight ratio of $In_2O_3$/phosphor to a level of from 1/99 to 7/13, and in the case where $In_2O_3$ is adhered to the surface of the phosphor particles, it is preferred to adjust the weight ratio of $In_2O_3$/phosphor to a level of from 1/199 to 3/7.

FIG. 1 is a graph illustrating the relation between the degree of crystallization of $In_2O_3$ to be used and the luminance under low velocity electron beam excitation of the fluorescent composition thereby obtained, with respect to various fluorescent compositions obtained by mixing a $(Zn_{0.3},Cd_{0.7})S:Ag$ phosphor and $In_2O_3$ having different degrees of crystallization in a weight ratio of 9:1. The abscissa in FIG. 1 indicates the half value width ($2\theta$) of the strongest diffraction line in the diffraction X-ray spectrum of $In_2O_3$, which is an index of the degree of crystallization of $In_2O_3$ to be used, and the ordinate indicates a relative value of the luminance of each fluorescent composition, as evaluated on the basis that a fluorescent composition using conventional $In_2O_3$ having a half value width ($2\theta$) of the strongest diffraction line in the diffraction X-ray spectrum being 0.26° is used as the standard fluorescent composition, and the luminance of the standard fluorescent composition is regarded as 100. As is evident from FIG. 1, when $In_2O_3$ wherein the half value width ($2\theta$) of the strongest diffraction line in the diffraction X-ray spectrum is substantially within a range of from 0.10° to 0.25°, is employed, it is possible to obtain a fluorescent composition having a luminance equal to or superior to the standard fluorescent composition. Particularly when $In_2O_3$ wherein the half value width ($2\theta$) of the strongest diffraction line is substantially within a range of from 0.13° to 0.20°, is used among them, a fluorescent composition having an especially high luminance can be obtained.

FIG. 1 illustrates a case wherein only a $(Zn_{0.3},Cd_{0.7})S:Ag$ phosphor is used as one of the constituting components of the fluorescent composition. However, interrelation similar to FIG. 1 is observed between the degree of crystallization of $In_2O_3$ to be used and the luminance of the fluorescent composition thereby obtained, also in cases wherein fluorescent compositions using phosphors other than the $(Zn_{0.3},Cd_{0.7})S:Ag$ phosphor, are used. It has been confirmed further that the luminance under a low velocity electron beam excitation of the resulting fluorescent composition can further be improved, when $In_2O_3$ wherein the half value width ($2\theta$) of the strongest diffraction line in the diffraction X-ray spectrum as an index of the degree of crystallization of $In_2O_3$ is within a range of from 0.10° to 0.25°, is employed.

Now, the present invention will be described in further detail with reference to Examples. However, it should be understood that the present invention is by no means restricted by such specific Examples.

EXAMPLE 1

Among commercially available $In_2O_3$, three types of $In_2O_3$ differing in the degree of crystallization (these materials are designated as $In_2O_3$ (A), $In_2O_3$ (B) and $In_2O_3$ (D), respectively) were selected. Further, a part of $In_2O_3$ (A) was calcined in air at a temperature of 900° C. for 1 hour (the obtained $In_2O_3$ was designated as $In_2O_3$ (C). Another part of $In_2O_3$ (A) was calcined also in air at a temperature of 1,300° C. for 1 hour (the obtained $In_2O_3$ was designated as $In_2O_3$ (E)). With respect to the respective $In_2O_3$, the diffraction X-ray spectra of the respective samples were measured by means of an X-ray diffractometer (manufactured by Rigaku Denki K.K.), and their half value widths ($2\theta$) of the respective strongest diffraction lines were obtained. The results thereby obtained are shown in Table 1.

Then, 90 parts by weight of a $(Zn_{0.3},Cd_{0.7})S:Ag$ phosphor and 10 parts by weight of the above $In_2O_3$ (A) were thoroughly mixed in a ball mill to obtain a fluorescent composition [1-A]. Further, a fluorescent composition [1-B], a fluorescent composition [1-C], a fluorescent composition [1-D] and a fluorescent composition [1-E] were prepared in the same manner as the fluorescent composition [1-A] except that $In_2O_3$ (B), $In_2O_3$ (C), $In_2O_3$ (D) and $In_2O_3$ (E) were used, respectively, instead of $In_2O_3$ (A).

The respective fluorescent compositions thus obtained were compared by relative luminance under excitation by a low velocity electron beam at an acceleration voltage of 20 V. The results thereby obtained are shown in Table 1. The fluorescent composition [1-C] and the fluorescent composition [1-D] employing $In_2O_3$ wherein the half value width ($2\theta$) of the strongest diffraction line in the diffraction X-ray spectrum was 0.20° and 0.18°, respectively, exhibited particularly high luminance.

TABLE 1

| Fluorescent composition | Phosphor | $In_2O_3$ Type | Half value width of the strongest diffraction line ($2\theta$) | Relative luminance (%) |
| --- | --- | --- | --- | --- |
| [1-A] | $(ZnO_{.3},Cd_{0.7})S:Ag$ | $In_2O_3$ (A) | 0.28° | 93 |
| [1-B] | $(ZnO_{.3},Cd_{0.7})S:Ag$ | $In_2O_3$ (B) | 0.26° | 100 |
| [1-C] | $(ZnO_{.3},Cd_{0.7})S:Ag$ | $In_2O_3$ (C) | 0.20° | 130 |
| [1-D] | $(ZnO_{.3},Cd_{0.7})S:Ag$ | $In_2O_3$ (D) | 0.18° | 133 |
| [1-E] | $(ZnO_{.3},Cd_{0.7})S:Ag$ | $In_2O_3$ (E) | 0.09° | 95 |

EXAMPLE 2

0.6 part by weight of gelatin was dissolved in warm water of 40° C. to obtain a 0.3% gelatin aqueous solution. Into this solution, 90 parts by weight of a ZnS:Au,Al phosphor was added, and the mixture was thoroughly stirred to obtain a phosphor dispersion.

On the other hand, 0.4 part by weight of gum arabic was dissolved in water to obtain a 0.3% gum arabic aqueous solution. Into this solution, 10 parts by weight of the $In_2O_3$ (A) as used in Example 1 was added, and the mixture was thoroughly stirred to obtain a dispersion of $In_2O_3$ (A) particles.

Then, the above phosphor dispersion and the dispersion of $In_2O_3$ (A) particles were mixed under stirring, and the mixture was adjusted to pH 4 and cooled to a temperature of not higher than 10° C. Then, 1 part by weight of formalin was gradually added under stirring and cooling. The supernatant was removed by decantation, and the residue was washed with water. The solid content was dried to obtain a fluorescent composition [2-A] having $In_2O_3$ (A) adhered to the ZnS:Au,Al phosphor. Further, a fluorescent composition [2-B], a fluorescent composition [2-C], a fluorescent composition [2-D] and a fluorescent composition [2-E] were prepared in the same manner as the fluorescent composition [2-A] except that $In_2O_3$ (B), $In_2O_3$ (C), $In_2O_3$ (D) and $In_2O_3$ (E) used in Example 1, were employed instead of $In_2O_3$ (A).

The respective fluorescent compositions thus obtained were compared by relative luminance under excitation by a low velocity electron beam at an acceleration voltage of 20 V. The results thereby obtained are shown in Table 2. The fluorescent composition [2-C] and the fluorescent composition [2-D] employing $In_2O_3$ wherein the half value width ($2\theta$) of the strongest diffraction line in the diffraction X-ray spectrum was 0.20° and 0.18°, respectively, exhibited particularly high luminance.

TABLE 2

| Fluorescent composition | Phosphor | $In_2O_3$ Type | Half value width of the strongest diffraction line ($2\theta$) | Relative luminance (%) |
| --- | --- | --- | --- | --- |
| [2-A] | ZnS:Au,Al | $In_2O_3$ (A) | 0.28° | 89 |
| [2-B] | ZnS:Au,Al | $In_2O_3$ (B) | 0.26° | 100 |
| [2-C] | ZnS:Au,Al | $In_2O_3$ (C) | 0.20° | 120 |
| [2-D] | ZnS:Au,Al | $In_2O_3$ (D) | 0.18° | 125 |
| [2-E] | ZnS:Au,Al | $In_2O_3$ (E) | 0.09° | 90 |

EXAMPLE 3

A fluorescent composition [3-A] was prepared in the same manner as the fluorescent composition [1-A] in Example 1 except that 98 parts by weight of a ZnO:Zn phosphor was used instead of 90 parts by weight of the $(Zn_{0.3},Cd_{0.7})S:Ag$ phosphor, and 2 parts by weight of $In_2O_3$ (A) was used instead of 10 parts by weight of $In_2O_3$ (A). Further, a fluorescent composition [3-B], a fluorescent composition [3-C], a fluorescent composition [3-D] and a fluorescent composition [3-E] were prepared in the same manner as the fluorescent composition [3-A] except that $In_2O_3$ (B), $In_2O_3$ (C), $In_2O_3$ (D) and $In_2O_3$ (E) as used in Example 1 were employed instead of $In_2O_3$ (A).

The respective fluorescent compositions thus obtained were compared by the relative luminance under excitation by a low velocity electron beam at an acceleration voltage of 20 V. The results thereby obtained are shown in Table 3. The fluorescent composition [3-C] and the fluorescent composition [3-D] employing $In_2O_3$ wherein the half value width ($2\theta$) of the strongest diffraction line in the diffraction X-ray spectrum was 0.20° and 0.18°, respectively, exhibited particularly high luminance.

TABLE 3

| Fluorescent composition | Phosphor | $In_2O_3$ Type | Half value width of the strongest diffraction line ($2\theta$) | Relative luminance (%) |
| --- | --- | --- | --- | --- |
| [3-A] | ZnO:Zn | $In_2O_3$ (A) | 0.28° | 95 |
| [3-B] | ZnO:Zn | $In_2O_3$ (B) | 0.26° | 100 |
| [3-C] | ZnO:Zn | $In_2O_3$ (C) | 0.20° | 124 |
| [3-D] | ZnO:Zn | $In_2O_3$ (D) | 0.18° | 125 |
| [3-E] | ZnO:Zn | $In_2O_3$ (E) | 0.09° | 100 |

As described in detail in the foregoing, a fluorescent composition having a phosphor capable of emitting light under excitation by a high velocity electron beam and In$_2$O$_3$ mixed or mutually adhered to each other, wherein In$_2$O$_3$ with the half value width (2θ) of the strongest diffraction line in the diffraction X-ray spectrum being substantially within a range of from 0.10° to 0.25°, is employed as its constituting component, exhibits remarkably improved luminance under excitation by a low velocity electron beam at an acceleration voltage of not higher than 1 kV. Thus, it is very useful as a phosphor for a fluorescent display tube particularly as a display element for meters for automobiles where the visibility is essential.

What is claimed is:

1. A fluorescent composition for low velocity electron beam excitation at an acceleration voltage of not higher than about 1 kV, comprising a phosphor capable of emitting light under excitation by a high velocity electron beam above 1 kV acceleration voltage and inidium oxide (In$_2$O$_3$) mixed or mutually adhered to each other, wherein the half value width of the strongest diffraction line in the diffraction X-ray spectrum of said indium oxide (In$_2$O$_3$) is within a range of from 0.10° to 0.25°, and wherein the weight ratio of In$_2$O$_3$ to the phosphor is 1/99 to 7/13 for the case of a mixture of the phsophor and In$_2$O$_3$ and is 1/199 to 3/7 for the case that the In$_2$O$_3$ is adhered to the phosphor, said fluorescent composition exhibiting a higher luminance than the fluorescent composition, as defined above but where the half value width of the strongest diffraction line in the diffraction X-ray spectrum of the indium oxide is outside of said range.

2. The fluorescent composition for low velocity electron beam excitation according to claim 1, wherein the half value width is within a range of from 0.13° to 0.20°.

3. The fluorescent composition for low velocity electron beam excitation according to claim 2, wherein the phosphor is a sulfide phosphor whose hot material is the formula (Zn$_{1-x}$, Cd$_x$)S wherein x is a number satisfying a condition of $0 \leq x \leq 1$.

4. The fluorescent composition for low velocity electron beam excitation according to claim 2, wherein the phosphor is a zinc-activated zinc oxide phosphor (ZnO:Zn).

5. The fluorescent composition for low velocity electron beam excitation according to claim 1, wherein the phosphor is a sulfide phosphor whose host material is a sulfide of the formula (Zn$_{1-x}$, Cd$_x$)S wherein x is a number satisfying a condition of $0 \leq x \leq 1$.

6. The fluorescent composition for low velocity electron beam excitation according to claim 1, wherein the phosphor is a zinc-activated zinc oxide phosphor (ZnO:Zn).

* * * * *